(12) United States Patent
Mainini et al.

(10) Patent No.: US 8,813,682 B2
(45) Date of Patent: Aug. 26, 2014

(54) DEVICE FOR DISPENSING A FLUIDIC CONSUMABLE FOR AN ANIMAL

(71) Applicant: Radio Systems Corporation, Knoxville, TN (US)

(72) Inventors: Christopher E. Mainini, Knoxville, TN (US); Greg Gillis, Escondido, CA (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 14/102,113

(22) Filed: Dec. 10, 2013

(65) Prior Publication Data
US 2014/0102373 A1    Apr. 17, 2014

Related U.S. Application Data

(62) Division of application No. 12/693,623, filed on Jan. 26, 2010, now Pat. No. 8,631,765.

(51) Int. Cl.
*A01K 7/02* (2006.01)
*A01K 39/02* (2006.01)

(52) U.S. Cl.
CPC .. *A01K 7/02* (2013.01); *A01K 39/02* (2013.01)
USPC .......................................... 119/72.5; 119/78

(58) Field of Classification Search
CPC ... A01K 39/012; A01K 39/02; A01K 5/0291; A01K 5/0114; A01K 39/024; A01K 5/0275; A01K 7/00; A01K 7/02; A01K 7/04; A01K 5/02

USPC ............... 119/72, 72.5, 78, 74, 79, 80, 51.01, 119/51.02, 51.11, 51.12, 51.5, 53, 52.1, 119/56.1, 57.1
See application file for complete search history.

(56) References Cited

U.S. PATENT DOCUMENTS

| | | | | |
|---|---|---|---|---|
| 4,069,793 | A * | 1/1978 | Gower | 119/51.13 |
| 4,355,596 | A * | 10/1982 | Peppler | 119/457 |
| 4,463,706 | A * | 8/1984 | Meister et al. | 119/51.02 |
| 4,502,416 | A * | 3/1985 | Keysell et al. | 119/51.11 |
| 5,315,958 | A * | 5/1994 | Forster | 119/54 |
| 7,380,518 | B2 * | 6/2008 | Kates | 119/72 |
| 7,387,083 | B2 * | 6/2008 | Nardine et al. | 119/72 |
| 7,481,181 | B2 * | 1/2009 | Arnerup et al. | 119/71 |
| 2004/0194714 | A1 * | 10/2004 | Lee | 119/54 |
| 2005/0224003 | A1 * | 10/2005 | Yin et al. | 119/61.5 |
| 2005/0279287 | A1 * | 12/2005 | Kroeker | 119/72 |
| 2006/0201436 | A1 * | 9/2006 | Kates | 119/72 |
| 2006/0219187 | A1 * | 10/2006 | Krishnamurthy | 119/719 |
| 2008/0127901 | A1 * | 6/2008 | Kleinsasser | 119/51.11 |
| 2009/0020074 | A1 * | 1/2009 | Harman | 119/51.11 |
| 2009/0107405 | A1 * | 4/2009 | Hare et al. | 119/51.01 |

* cited by examiner

*Primary Examiner* — Trinh Nguyen
(74) *Attorney, Agent, or Firm* — Pitts & Lake, P.C.

(57) ABSTRACT

Described is a fluidic consumable dispensing device for reliably and consistently dispensing uniform animal consumables. More specifically, the device dispenses animal consumables having the viscosity of a fluid such that the consumables are not broken or malformed and do not become oriented within the device such that they clog the flow of consumables from the device.

7 Claims, 1 Drawing Sheet

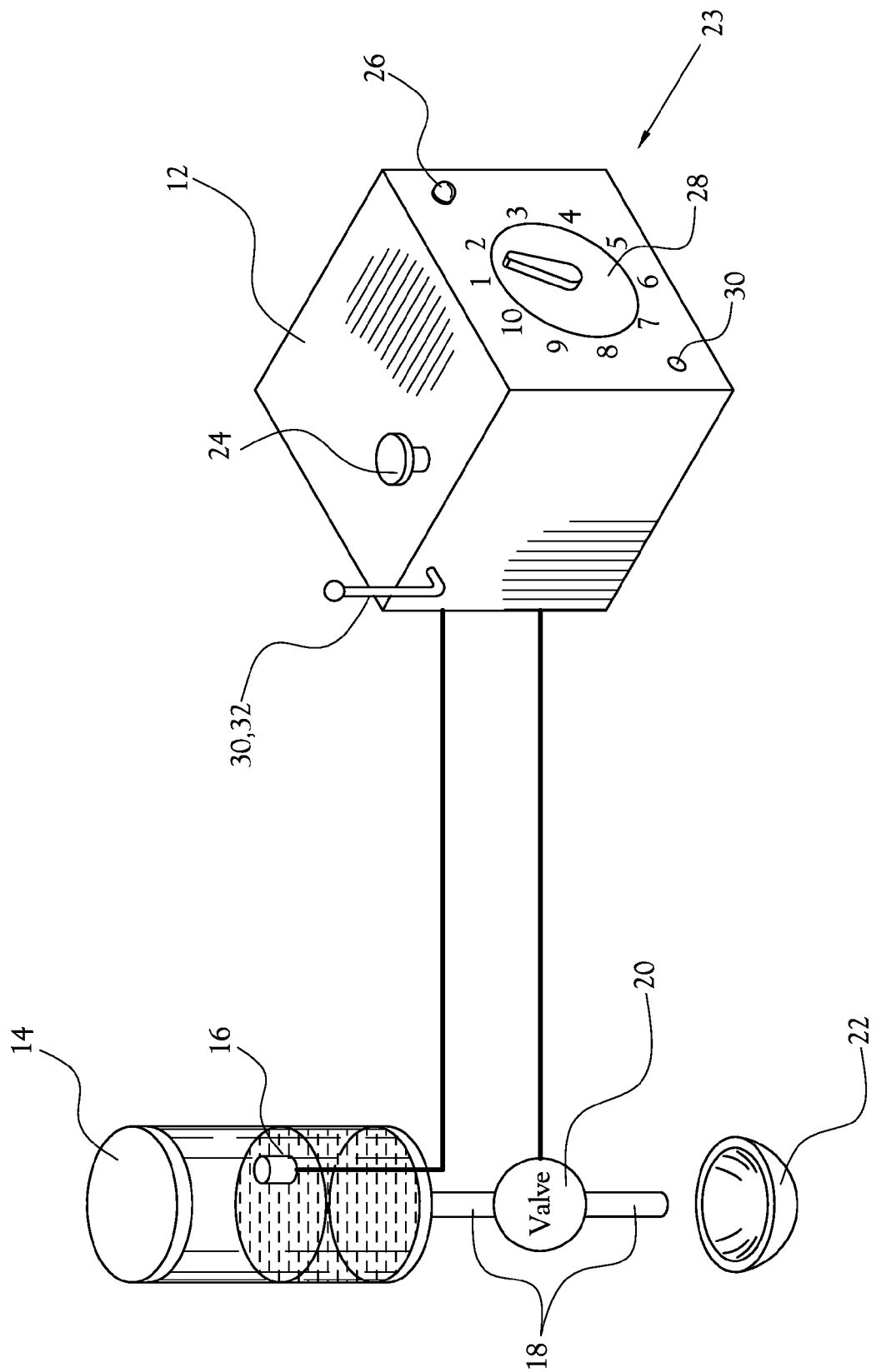

DEVICE FOR DISPENSING A FLUIDIC CONSUMABLE FOR AN ANIMAL

CROSS-REFERENCE TO RELATED APPLICATIONS

This application is a divisional patent application of U.S. patent application Ser. No. 12/693,623, filed on Jan. 26, 2010, the disclosure of which is incorporated by reference herein in its entirety.

STATEMENT REGARDING FEDERALLY SPONSORED RESEARCH OR DEVELOPMENT

Not Applicable

BACKGROUND OF THE INVENTION

1. Field of the Invention

This invention pertains to a device for dispensing an animal consumable, such as an animal treat, the animal consumable having the viscosity of a fluid.

2. Description of the Related Art

Providing an animal a consumable treat to reward the animal for a desired exhibited behavior is a critical component of the animal training process. Currently, there are devices that automate this training process and, as a result, automatically dispense a treat in response to a detected action or in accordance with a predetermined schedule. Conventional animal treats are baked to have a crunchy consistency or formulated to have a soft and chewy consistency. The dimensions and overall shape of conventional treats are such that the treats are prone to being broken to the extent that there is a lack of uniformity in size and shape among treats even from the same batch. Because of this inconsistency in size and shape, conventional treats are problematic when used in an automatic treat dispenser. More specifically, the mechanisms used to automatically dispense conventional treats cannot reliably or accurately dispense the desired amount of the treats because they cannot accurately count or measure treats of various shapes and sizes. Additionally, because conventional treats ultimately have unpredictable shapes and sizes, automatic treat dispensers frequently become jammed and dispense no treats when programmed to do so, dispense treats when not programmed to do so, or dispense more or less treats than programmed to do so. Additionally, conventional treats, which are prone to breaking and crumbling, ultimately result in crumbs and dust that accumulate within, on, and about a conventional treat dispenser, detrimentally affecting the cleanliness and functionality of the dispenser. Consequently, a device that automatically, reliably, and consistently dispenses uniform animal consumables is desired.

BRIEF SUMMARY OF THE INVENTION

In accordance with the various features of the present invention there is provided a fluidic consumable dispensing device for reliably and consistently dispensing uniform animal consumables. The fluidic consumable dispensing device includes a fluid reservoir, a valve, a control module, and a reservoir. The fluid reservoir stores a fluid, which is a plurality of fluidic animal consumables and, as such, is any consumable substance that is appealing or enticing to an animal and that has the viscosity of a fluid. The fluid reservoir is in fluidic communication with the valve, which is moveable between a closed position and an open position. When at the closed position, the valve prevents the fluid from flowing from the fluid reservoir. When at the open position, the valve permits the fluid to flow from the fluid reservoir. The control module is in communication with the valve such that the control module moves the valve between the closed position and the open position. More specifically, upon the occurrence of a predetermined event, the control module moves the valve to the open position for a predetermined period of time and, at the expiration of the predetermined period of time, moves the valve to the closed position. The predetermined event includes the operation of a manual control or the reception of an activation signal from a peripheral device. The predetermined period of time is adjusted by a parameter adjustment control. The fluid that flows from the fluid reservoir during the predetermined period of time is a fluidic animal consumable. Accordingly, the predetermined period of time is directly proportional to the size of the animal consumable. Because the animal consumables have the viscosity of a fluid, they are not broken or malformed and do not become oriented within the device such that they clog the flow of consumables from the device. Accordingly, the fluidic consumable dispensing device reliably and consistently dispenses uniform animal consumables.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 is a block diagram of one embodiment of the fluidic consumable dispensing device in accordance with the various features of the present invention.

DETAILED DESCRIPTION OF THE INVENTION

The present invention provides a fluidic consumable dispensing device for reliably and consistently dispensing uniform animal consumables. More specifically, the device dispenses animal consumables having the viscosity of a fluid such that the consumables are not broken, malformed, or become oriented within the device such that they clog the flow of consumables from the device. A block diagram of one embodiment of the fluidic consumable dispensing device constructed in accordance with the various features of the present invention is illustrated generally at 10 in FIG. 1.

The fluidic consumable dispensing device 10 of FIG. 1 includes a control module 12, a fluid reservoir 14, a fluid level detector 16, a conduit 18, a valve 20, and a receptacle 22. The control module 12 is in communication with the fluid level detector 16 and the valve 20. For example, in one embodiment, such communication is electrical. The control module 12 also includes an interface panel 23 for facilitating the operation of the device 10. In the illustrated embodiment, the interface panel 23 includes a manual activation control 24, a fluid level indicator 26, a consumable parameter adjustment control 28, and an auxiliary activation port 30. The fluid reservoir 14 is in fluidic communication with the valve 20. In the illustrated embodiment, such fluidic communication is by way of the conduit 18. Also, in the illustrated embodiment, the conduit 18 is disposed at both the input and output of the valve 20 such that fluid passing through the valve 20 is further directed by the conduit 18. The receptacle 22 is disposed with respect to the valve 20 such that fluid passing through the valve 20 is received by the receptacle 22. In the illustrated embodiment, a portion of the conduit 18 directs fluid passing through the valve 20 to the receptacle 22.

The fluid reservoir 14 stores a plurality of fluidic animal consumables. A fluidic animal consumable is any substance that is edible and consumable by an animal and that has the viscosity of a fluid. Accordingly, the fluidic animal consumable can be an animal treat, a dietary supplement, or a medication. Additionally, in one embodiment, the fluidic animal consumable can be a water-based substance having a flavor or scent that is appealing to the animal. Along these lines, the fluidic animal consumable can be a powder substance or a liquid concentrate combined with water, whereby the powder substance or the liquid concentrate is stored and sold independently and in its dry or concentrated state. In view of the physical properties, namely the viscosity, of the fluidic animal consumables, when a plurality of the fluidic animal consumables is stored at the fluid reservoir 14, each of the fluidic animal consumables is not discrete and discernable. Instead, the fluid reservoir 14 stores an amount of fluid, from which a discernable fluidic animal consumable is drawn, as will be further discussed in subsequent discussion. Although specific examples of the fluidic animal consumable have been discussed above, it should be noted that the fluidic animal consumable can be any substance that is consumable by an animal and that has the viscosity of a fluid without departing from the scope or spirit of the present invention.

The fluid level detector 16 detects the amount of fluid that is contained within the fluid reservoir 14. State differently, the fluid level detector 16 detects the amount of fluidic animal consumables contained within the fluid reservoir 14. In the illustrated embodiment, the fluid level detector 16 includes a buoyant member that is disposed within the fluid reservoir 14 and that floats in the fluid contained therein such that the buoyant member's position with respect to the top or bottom of the fluid reservoir 14 indicates the amount of the fluid that is within the fluid reservoir 14. The fluid level detector 16 indicates the amount of fluid contained within the fluid reservoir 14 to the control module 12, such as by way of an electrical signal. The control module 12 receives the indication from the fluid level detector 16 and activates the fluid level indicator 26 such that it indicates to a user the amount the fluid within the fluid reservoir 14. In the illustrated embodiment, the fluid level indicator 26 is a light emitting diode (LED) that is activated when the fluid within the fluid reservoir 14 is below a predetermined threshold. It should be noted that the fluid level indicator 26 can be an indicator other than an LED, such as a gauge, without departing from the scope or spirit of the present invention.

The parameter adjustment control 28 of the control module 12 permits the adjustment of at least one parameter of the fluidic animal consumable, namely the size or the amount of fluid that defines each fluidic animal consumable. In the illustrated embodiment, the parameter adjustment control 28 is a rotary switch that permits a user to select the size of the fluidic animal consumable from a discrete number of sizes. However, it should be noted that the parameter adjustment control 28 can be any control, mechanical or electrical, that permits the adjustment of the parameters of the fluidic animal consumable. It should also be noted that the parameter adjustment control 28 can be used to adjust parameters of the fluidic animal consumable other than size, such as substance, without departing from the scope or spirit of the present invention.

The fluidic consumable dispensing device 10 dispenses a fluidic animal consumable upon the occurrence of a predefined activation event. In the illustrated embodiment, both the manual operation of the manual activation control 24 and the reception of an activation signal by the control module 12 constitute an activation event. More specifically, the manual activation control 24 is a user operated control that permits the user to manually activate the device 10 to dispense a fluidic animal consumable. In the illustrated embodiment, the manual activation control 24 is a push button switch, but the manual activation control 24 can be any control, mechanical or electrical, operable by a user. The auxiliary activation port 30 establishes electrical communication between a peripheral device and the control module 12, the peripheral device being capable of transmitting the activation signal, which is receivable by the control module 12. The activation signal can be transmitted wirelessly or by hardwire. Accordingly, in one embodiment, the auxiliary activation port 30 is adapted to physically receive, for example, a cable in electrical communication with the peripheral device. In another embodiment, the auxiliary activation port 30 includes or is in electrical communication with an antenna 32 that receives the wirelessly transmitted activation signal.

Considering the above discussion, the auxiliary activation port 30 permits the fluidic consumable dispensing device 10 to interface with a peripheral animal training device such that the peripheral animal training device activates the device 10 to dispense a fluidic animal consumable. For example, when the peripheral animal training device is a device for detecting a desired behavior exhibited by an animal and for rewarding the detected behavior, the peripheral animal training device transmits the activation signal to the fluidic consumable dispensing device 10, by way of the auxiliary activation port 30, when the peripheral device detects the desired behavior. When the fluidic consumable dispensing device 10 receives the activation signal, it dispenses a fluidic animal consumable in accordance with subsequent discussion.

When the manual activation control 24 is operated or the control module 12 receives the activation signal by way of the auxiliary activation port 30, the control module 12 activates the valve 20 to dispense a fluidic animal consumable, the parameters of which being defined by the parameter adjustment control 28. More specifically, the valve 20 is in fluidic communication with the fluid reservoir 14 such that fluid flowing from the fluid reservoir 14 flows through the valve 20. The valve 20 is moveable between a closed position and an open position. When at the closed position, the valve 20 prevents fluid from flowing therethrough, thus preventing fluid from flowing from the fluid reservoir 14. When at the open position, the valve 20 permits fluid to flow therethrough, thus permitting fluid to flow from the fluid reservoir 14. Accordingly, when the control module 12 is not activating the valve 20 to dispense a fluidic animal consumable, the valve 20 is at the closed position such that fluid does not flow from the fluid reservoir 14. On the other hand, when the control module 12 activates the valve 20 to dispense a fluidic animal consumable, the control module 12 moves the valve 20 to the open position for a predetermined period a time and moves the valve 20 back to the closed position when the period of time expires. This predetermined period of time defines the size of the dispensed fluidic animal consumable and is governed by the parameter adjustment control 28. Stated differently, the amount of time the valve 20 is at the open position is directly proportional to the amount of fluid that flows from the fluid reservoir 14.

As discussed above, the receptacle 22 is positioned with respect to the valve 20 such that fluid flowing through the valve 20 is received by the receptacle 22. Consequently, the receptacle 22, which is accessible by the animal, receives the dispensed fluidic animal consumable.

In view of the above discussion, when the user operates the manual activation control 24 or the control module 12 receives the activation signal by way of the auxiliary activation port 30, the control module 12 activates the valve 20, that is, moves the valve 20 to the open position for the predetermined period of time defined by the parameter adjustment control 28, permitting fluid to flow from the fluid reservoir 14 for the period of time. When the predetermined period of time expires, the control module 12 moves the valve 20 to the closed position, stopping fluid from flowing from the fluid reservoir 14. The fluid that flows from the fluid reservoir 14 during the predetermined period of time is received by the receptacle 22 and is the fluidic animal consumable. Because the fluidic animal consumable has the viscosity of a fluid, the consumable cannot be broken into smaller pieces and cannot become situated within the fluid reservoir 14, the conduit 18, or the valve 20 such that it clogs or restricts the flow of the consumables to the receptacle 22. Additionally, because the valve 20 is at the open position for the same amount of time each time a fluidic animal consumable is dispensed, unless otherwise adjusted, all dispensed fluidic animal consumables are uniform in size and volume. Accordingly, the device 10 is capable of reliably and consistently delivering a uniformly sized animal consumable upon each occurrence of the predefined activation event.

From the foregoing description, those skilled in the art will recognize that a consumable dispensing device for reliably and consistently dispensing uniform animal consumables offering advantages over the prior art has been provided. More specifically, the device dispenses animal consumables having the viscosity of a fluid such that the consumables are not broken, malformed, or become oriented within the device such that they clog the flow of consumables from the device.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A method for consistently delivering uniform animal consumables, said method comprising the steps of:

providing a dispensing device having a fluid reservoir capable of storing a fluid, the dispensing device being configured to communicate with a peripheral device, the fluid being a plurality of fluidic animal consumables having the viscosity of a fluid;

providing a valve in fluidic communication with the fluid reservoir, the valve being movable between a closed position and an open position, the fluid flowing from the fluid reservoir when the valve is at the open position, the fluid not flowing from the fluid reservoir when the valve is at the closed position; detecting an occurrence of a predetermined activation event by the peripheral device;

transmitting an activation signal by the peripheral device to the valve upon the occurrence of the predetermined activation event;

moving the valve to the open position for a predetermined period of time upon receiving the activation signal; and moving the valve to the closed position at the expiration of the predetermined period of time, the fluid that flows from the fluid reservoir during the predetermined period of time being one of the plurality of fluidic animal consumables, the predetermined period of time being directly proportional to the size of the fluidic animal consumable.

2. The method of claim 1 further comprising the step of providing a parameter adjustment control that adjusts the predetermined period of time.

3. The method of claim 1 wherein the predetermined activation event includes the operation of a manual activation control.

4. The method of claim 1 wherein the predetermined activation event includes the reception of an activation signal transmitted by a peripheral device.

5. The method of claim 1 wherein each of the plurality of fluidic animal consumables is a water-based fluid.

6. The method of claim 1 wherein each of the plurality of fluidic animal consumables is a concentrated substance combined with water.

7. The method of claim 1 further comprising the step of receiving each of the plurality of fluidic animal consumables that flows from the fluid reservoir at a receptacle that is accessible by the animal.

\* \* \* \* \*